United States Patent [19]

Minami et al.

[11] Patent Number: 5,566,286

[45] Date of Patent: Oct. 15, 1996

[54] METHOD AND APPARATUS FOR VERIFYING DIMENSIONAL VALUES OF A DRAWING

[75] Inventors: Kazuhiro Minami, Fujisawa; Junji Kishaba, Yamato, both of Japan

[73] Assignee: International Business Machines Corporation, Armonk, N.Y.

[21] Appl. No.: 560,137

[22] Filed: Nov. 17, 1995

Related U.S. Application Data

[63] Continuation of Ser. No. 94,805, Jul. 21, 1993, abandoned.

[30] Foreign Application Priority Data

Jul. 21, 1992 [JP] Japan ................................. 4-193555

[51] Int. Cl.⁶ ..................................................... G06F 3/14
[52] U.S. Cl. ........................................... 395/131; 395/133
[58] Field of Search ................................. 395/119, 120, 395/131, 133

[56] References Cited

U.S. PATENT DOCUMENTS

| | | | |
|---|---|---|---|
| 4,058,849 | 11/1977 | Fitzgerald et al. | 395/102 |
| 4,855,939 | 8/1989 | Fitzgerald, Jr. et al. | 395/119 |
| 5,133,052 | 7/1992 | Bier et al. | 395/155 |
| 5,222,206 | 6/1993 | Liao | 395/131 |
| 5,297,241 | 3/1994 | Hirr, Jr. et al. | 395/127 |
| 5,341,462 | 8/1994 | Obata | 395/122 |

Primary Examiner—Phu K. Nguyen
Assistant Examiner—Cliff N. Vo
Attorney, Agent, or Firm—Volel Emile; Andrew J. Dillon

[57] ABSTRACT

A method of the present invention includes storing in a memory first data including coordinate values of straight lines forming the drawing and first color code and second data including a dimensional value between two straight lines and two coordinate values of the two straight lines; supplying the first data and second data to a display to display the drawing and dimensional values on a display screen; changing, in response to a selection of one straight line, first color code of the selected straight line to a predetermined color code, and changing first color codes of straight lines parallel to the selected straight line to second color code; reading second data including two coordinate values one of which is equal to a coordinate value of the selected straight line; and changing the second color code of first data, which includes a coordinate value equal to the other of the two coordinate values of the read second value and the second color code, to the first color code.

12 Claims, 6 Drawing Sheets

METHOD AND APPARATUS FOR VERIFYING DIMENSIONAL VALUES OF A DRAWING

This is a continuation of application Ser. No. 08/094,805, filed 21 Jul. 1993, now abandoned.

TECHNICAL FIELD

The present invention relates generally to a method and apparatus for verifying whether needed dimensional values are provided by an operator in a computer system generating graphics or drawings.

BACKGROUND ART

Figure 1:
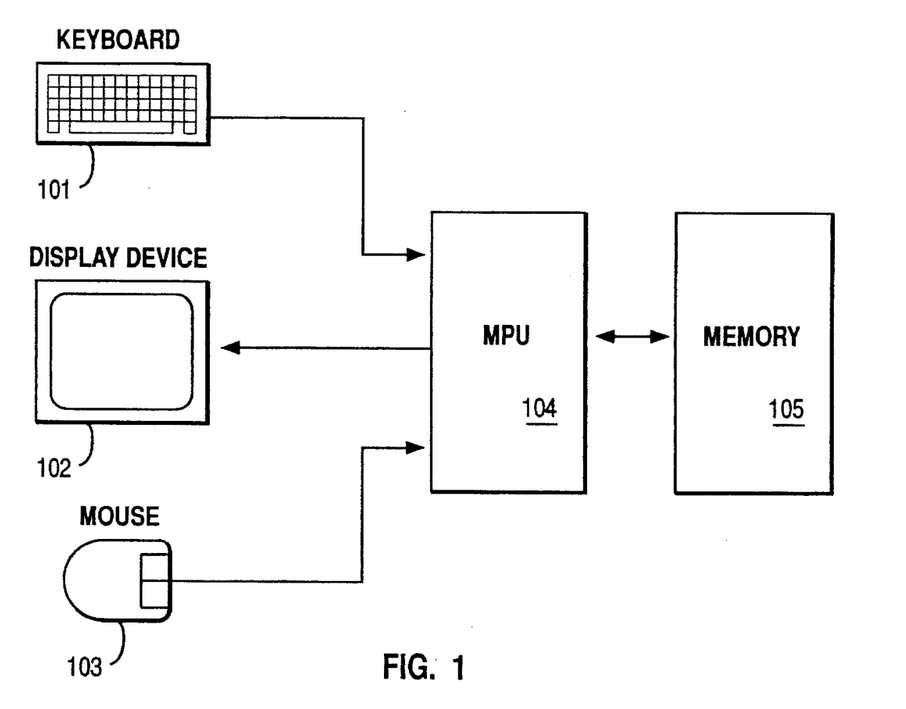
FIG. 1 is a block diagram illustrating a system for generating graphics or drawings.
Figure 2:
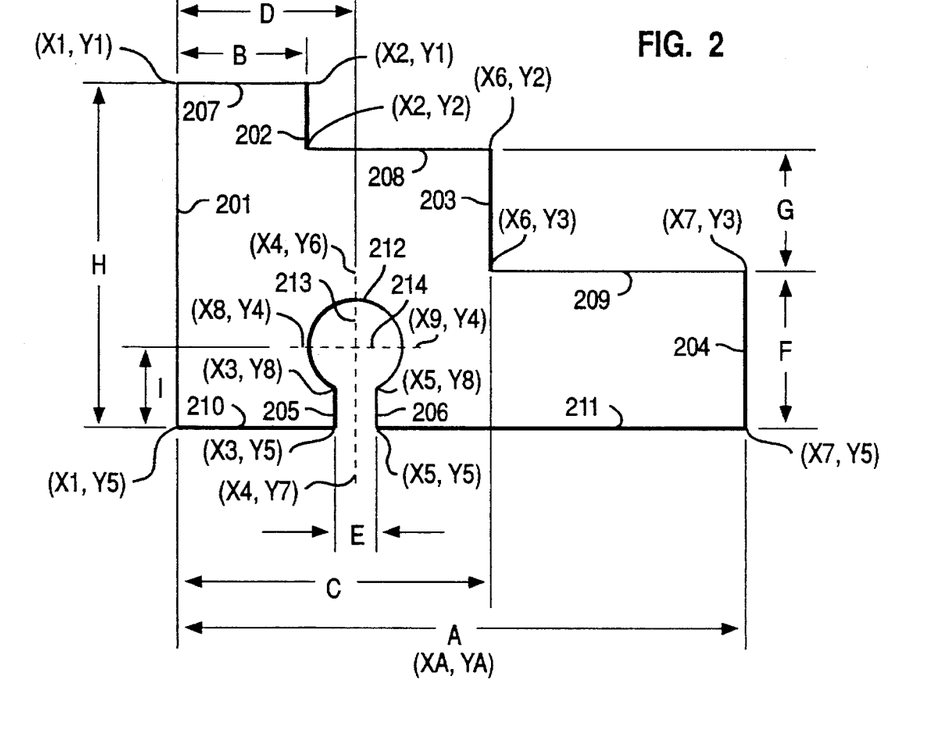
FIG. 2 illustrates one example of a drawing and its dimensional values.

FIG. 1 is a block diagram illustrating a system 100 for generating graphics or drawings. The system includes a keyboard 101, a display device 102, a mouse 103, main processing unit (MPU) 104 and a memory 105. For example, an operator can generate a graphics or drawing, such as shown in FIG. 2, on a display screen of the display device by using an input device, such as keyboard or mouse. The drawing or graphics shown in FIG. 2 includes vertical lines 201, 202, 203, 204, 205 and 206, horizontal lines 207, 208, 209, 210 and 211, and dashed lines 213 and 214 representing a center of a circle 212. To create or generate this drawing, the operator supplies coordinate data of the starting point and ending point of each straight line to the MPU through the input device. The MPU determines positions on the display screen corresponding to the specified coordinates to generate the coordinate values. The MPU generates a set of data for each straight line. A set of data are an identification code, e.g. 200, representing that data being processed is for the straight line, coordinate data of the starting point of the straight line, coordinate data of the ending point of the straight line and a color code. For example, a set of data for the straight line 201 are a code 200, X1, Y1, X1, Y5 and the color code (C/C) and are stored in an address N in memory. The color code when the drawing is created is called at first color code. For example, it may be a code for the color green. A set of data for the straight line 202, i.e. code 200, X2, Y1, X2, Y2 and C/C are stored. In this manner, the data for the vertical lines 201 through 206 are stored in memory. Next, a set of data for the horizontal lines 207 through 211 are stored in memory. Next, the data for the dashed lines 213 and 214; representing the center of the circle 212 are stored in memory. It is noted that the identification code of the dashed line is 201. In this manner, the data of the vertical lines, the horizontal lines and the dashed lines of the drawing or graphics are stored in the memory area.

Next, the operator inputs dimensional values A through I shown in FIG. 2 by using the input device. FIG. 2 shows the exemplary drawing into which all the required dimensional values are provided by the operator.

DISCLOSURE OF THE INVENTION

An operator provides dimensional values of a drawing for storage and rendering of the drawing. However, a complicated drawing includes a large number of the dimensional values, thereby making it difficult to check whether all the dimensional values are provided for the drawing. The present invention solves this problem.

The present invention includes a method for verifying whether a dimensional value is provided between straight lines of a drawing. This method includes the steps of storing in a memory first data, including coordinate values of straight lines forming the drawing, and first color code and second data, including a dimensional value between two straight lines, and two coordinate values of the two straight lines; supplying the first data and second data to a display means to display the drawing and dimensional values on a display screen; changing, in response to a selection of one straight line, first color code of the selected straight line to a predetermined color code, and changing first color codes of straight lines parallel to the selected straight line to second color code; reading second data including two coordinate values one of which is equal to a coordinate value of the selected straight line; and changing the second color code of first data, which includes a coordinate value equal to the other of the two coordinate values of the read second value and the second color code, to the first color code. The predetermined color codes include the first color code representing the first color. the second color code representing the second color, and the third color code representing the third color. The coordinate values of the first data and second data are values in X direction of XY coordinates. The coordinate values of the first data and second data are values in Y direction of XY coordinates.

The present invention also includes an apparatus of the present invention for verifying whether dimensional values are provided between straight lines of a drawing. This apparatus includes a memory for storing first data including coordinate values of straight lines forming the drawing and first color code indicating first color and second data including a dimensional value between two straight lines and two coordinate values of the two straight lines; apparatus for supplying the first data and second data to a display to display the drawing and dimensional values on a display screen; apparatus for responding to a selection of one straight line by an operator to access addresses of the memory means at which first data of straight lines parallel to the selected straight line are stored, to change first color code of first data of the selected straight line to a predetermined color code and to change first color code of first data of straight lines parallel to the selected straight line to second color code; apparatus for sequentially reading the second data from the memory means to find second data including two coordinate values one of which is equal to a coordinate value of the selected straight line; and apparatus for sequentially reading the first data from the memory means to find first data including coordinate value equal to the other of the two coordinate values of the found second data and the second color code to change the second color code of the found first data to the first color code.

A further understanding of the nature and advantages of the present invention may be realized by reference to the remaining portions of the specification and the drawings.

BEST MODE FOR CARRYING OUT THE INVENTION

Figure 3:
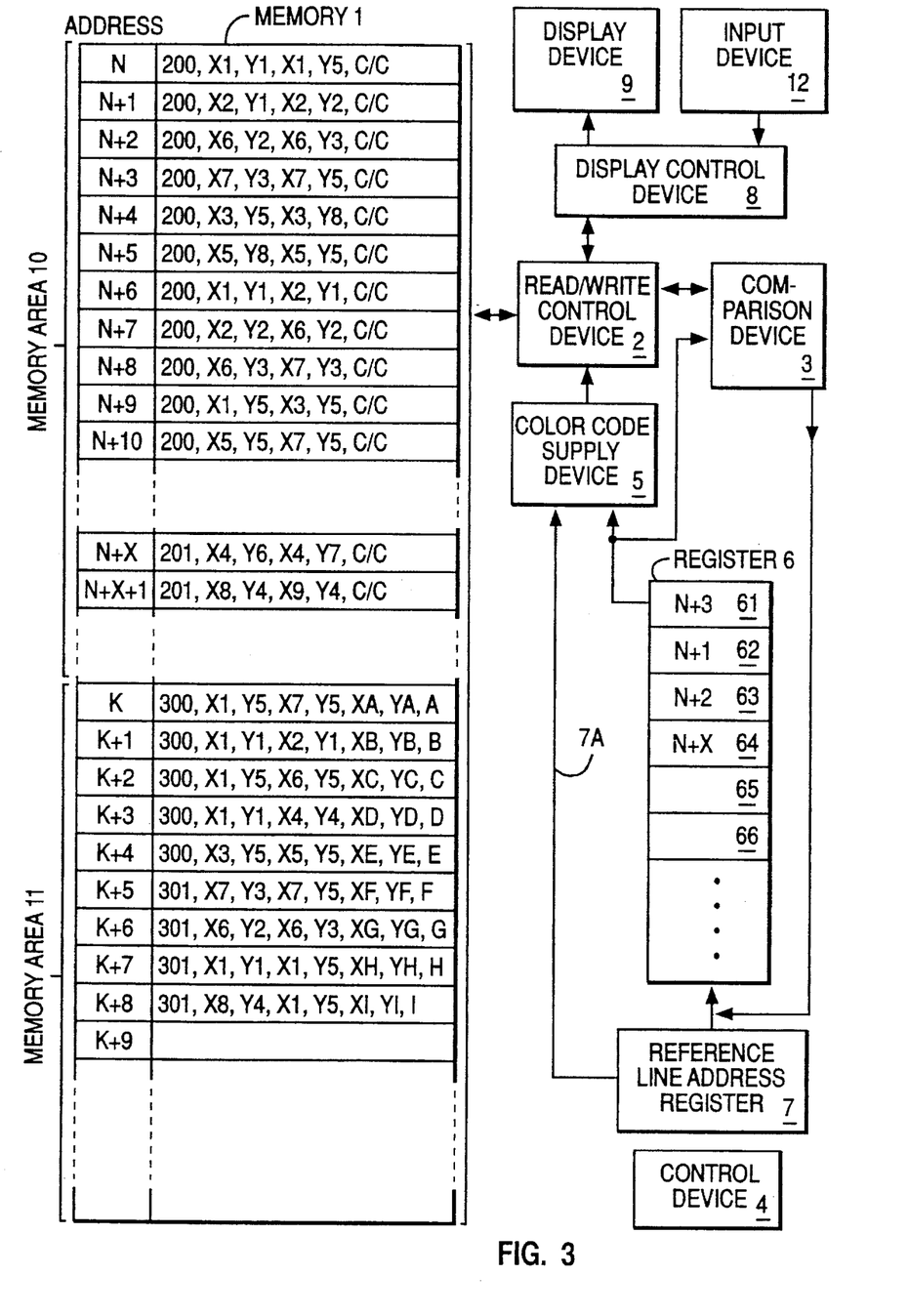
FIG. 3 is a block diagram illustrating a verification system in accordance with the present invention.

FIG. 3 illustrates an embodiment of a verification system according to the present invention. The verification system determines or checks the data stored in the memory areas 10 and 11 by using a read/write control device 2, a comparison device 3, a control device 4, a color code supply device 5, a first in-first out (FIFO) register 6 and a reference line address register 7, to determine whether all the required dimensional data (i.e. the dimensional data A through I shown in FIG. 2 in the exemplary case) have been provided in the graphics or drawing by the operator. The control device 4 is connected to the devices 2 through 5 and the register 7 to control the operation thereof. For simplifying the drawing, the connecting lines between the control device 4 and these devices are not shown.

In the example of FIG. 2, a set of data for the straight line 201 are a code 200, X1, Y1, X1, YS and the color code (C/C) and are stored in an address N in memory area 10. The color code when the drawing is created is called as first color code. For example, it may be a code for the color green. A set of data for the straight line 202, i.e. code 200, X2, Y1, X2, Y2 and C/C are stored in an address N+1. In this manner, the data for the vertical lines 201 through 206 are stored in the addresses N through N+5 of memory area 10. Next, a set of data for the horizontal lines 207 through 211 are stored in the addresses N+6 through N+10.

Next, the data for the dashed lines 213 and 214 representing the center of the circle 212 are stored in the addresses N+X and N+X+1 of the memory area 10. It is noted that the identification code of the dashed line is 201. In this manner, the data of the vertical lines, the horizontal lines and the dashed lines of the drawing or graphics are stored in memory area 10.

Next, the operator inputs dimensional values A through I shown in FIG. 2 by using the input device. FIG. 2 shows the exemplary drawing into which all the required dimensional values are provided by the operator. The input operation of the dimensional value A is hereby described as an example. The operator specifies the straight lines 201 and 204 and a display position of the dimensional value by using the input device. In response to the specification, the MPU generates the dimensional value A based upon the X coordinates of the straight lines 201 and 204 and generates the coordinated data of the dimensional value A, and generates a set of data including these values and stores them in the address K in the memory area 11. A set of data are a code 300 representing the horizontal dimensional value, the coordinates, i.e. X1, Y5, X7 and Y5, of the end points of the straight lines 201 and 204 which are nearest to the display position of the dimensional value A, the coordinated data XA, YA representing the display position of the dimensional value A and the dimensional value A. Next, the operator specifies the straight lines 201 and 202 and the display position of the dimensional value B by using the input device. In response to these specification, the MPU generates a set of data which are the code 300, X1, Y1, X2, Y1 representing the ending points of the straight lines 201 and 202 which is nearest to the dimensional value B, the coordinate data XB, YB representing the display position of the dimensional value B, and the dimensional value B. This data is stored in the address K+1 in memory. The data of the dimensional values C through I are stored In the addresses K+2 through K+8. In this manner, the data of the dimensional values are stored in memory area 11. The data of the dimensional values F, G, H and I in the vertical direction are stored in the addresses K+5 through K+8 in the memory. The dimensional data in the vertical direction are identified by a code 301. The reason that the dimensional data stored in the memory include the coordinate values of the ending points of the two straight lines is that these coordinate values are required for specifying the position of the lines to draw the dimensional value. Although the dimensional data stored in the memory include the color code, respectively, the color code is not shown for simplifying the drawing.

The data stored in the memory areas 10 and 11 are supplied to the display control device 8 through the read/write control device 2. The display control device 8, based upon these data, displays the graphics or drawing and the dimensional values shown in FIG. 2 on the display screen of the display device 9. The input device 12 is the mouse or the keyboard.

As described hereinbefore, FIG. 2 illustrates an exemplary graphics or drawing into which all the required dimensional values A through I are provided by the operator. The check or verification operation includes an operation for verifying all the dimensional values A through E in the horizontal direction which are related to the vertical straight lines are provided by the operator and an operation for verifying all the dimensional values F through I in the vertical direction are provided by the operator.

The verification operation for determining whether the dimensional values A, B, C, D and E in the horizontal direction are provided by the operator is hereby described. The verification operation is started from block 31 in FIG. 4, in which the graphic or drawing and the dimensional values are displayed by a first color (e.g. green). The operation proceeds to block 32, in which the operator selects one of a group of the vertical lines as a reference line to verify or determine the dimensional values in the horizontal direction shown in FIG. 2. For example, the vertical line 201 is selected as the reference line by the operator through the input device 12.

In response to the selection of the straight line 201 in block 32, the control device 4 in FIG. 3 determines address N in the memory area 10 which stores the data of the straight line 201 and stores the address N in the reference line address register 7. The control device 4 determines the address N in the following manner. When the operator selects one point on the straight line 201 displayed on the display screen by using the input device 12, the read/write control device 2 and the comparison device 3 determine the coordinate position of the one point under the control of the control device 4, sequentially access all the addresses in the memory area 10 to determine the straight line 201 passing through the one point and supply the address N to the reference line address register 7. The operation proceeds to block 33, in which the address N in the register 7 is directly supplied to a color code supply device 5 through a line 7A. A predetermined color code is given to the color code supply device 5 by the operator. For example, first color code representing the green color, second color code representing the red color, and third color code representing white color or another color are given by the operator. In response to the address supplied through the line 7A, the color code supply device 5 supplies the given color code and the address N of the reference straight line 201 to the read/write control device 2, whereby a color code in the address N is changed to the given color code. Further, in block 33, the read/write control device 2, the comparison device 3 and the color code supply device 5 determine, under the control of the control device 4, the straight lines 202, 203, 204, 205 and 206 which are parallel to the reference line 201, and change color codes in the addresses for these straight lines to the second color code, i.e. the red color code.

The above operation results in that the color of the reference straight line displayed on the display screen is one of the first, second and third colors and the color of all the vertical straight lines parallel to the reference straight line is changed to the red color. It is noted that the color of the horizontal lines of the drawing displayed on the display screen is the green color. It indicates that the verification operation is determining the missing of writing the dimensional values between the vertical straight lines.

Figure 5:
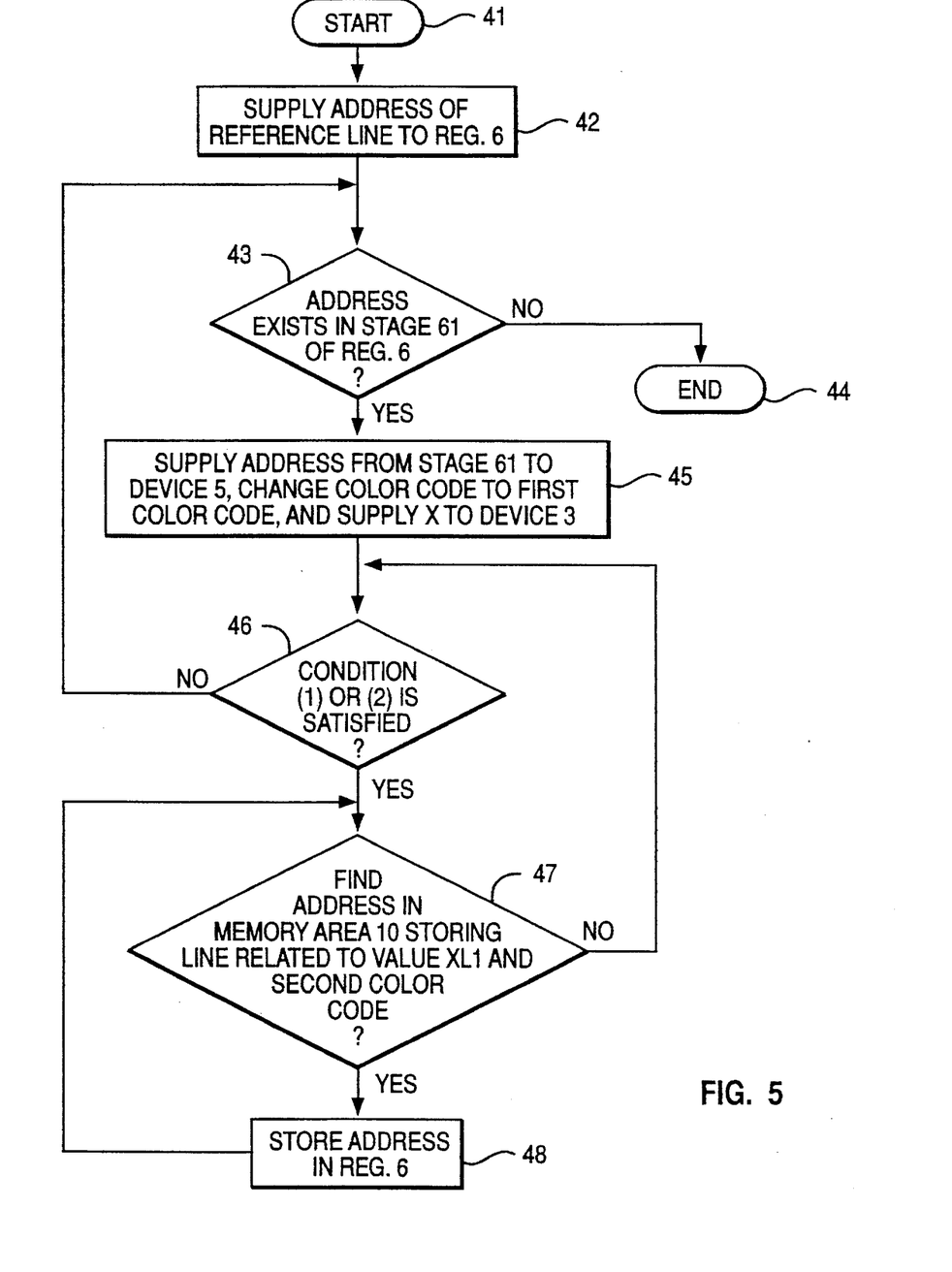

Next, the operation proceeds to block 34, in which the operation shown in FIG. 5 is performed. In block 41, the operation is started. The operation proceeds to block 42, in which the address N in the reference line address register 7 is stored in the first in -first out (FIFO) register 6. Since the register 6 is initially cleared, the address N is stored in a stage 61. The operation proceeds to block 43, in which the control device 4 determines as to whether the address of the reference line exists in the register 6. If the answer is NO, the operation proceeds to block 44, and the operation is terminated. If the answer is YES, the operation proceeds to block 45.

In block 45, under the control of the control device 4, the address N of the reference line 201 in the stage 61 of the register 6 is supplied to the color code supply device 5, so that the color code of the reference line 201 in the address N is changed to the color code of green. And, the read/write control device 2 supplies the data XL1 (X1 in this case) representing the position in the X direction among the data stored in the address N, to the comparison device 3.

The operation proceeds to block 46, in which, under the control of the control device 4, the read/write control device 2 sequentially reads out the data of the code 300 in the memory area 11 and supplies it to the comparison device 3. The comparison device 3 determines whether the data XL1 (X1 in this case) supplied by the operation of block 45 and the two coordinate values XL2 and XL3 in the X axis sequentially read from the memory area 11 satisfy the following conditions (1) or (2).

XL1=XL2 or XL1=XL3        Condition (1)

XL1=(XL2+XL3)/2           Condition (2)

Block 46 determines the condition (1) to determine whether the dimensional value related to the straight line passing through the XL1 (X1 for the straight line 201) in the X axis is stored in the memory area 11.

In the case of the straight line 201, the dimensional value A is provided between the straight lines 201 and 204, the dimensional value B is provided between the straight lines 201 and 202, the dimensional value C is provided between the straight lines 201 and 203 and the dimensional value D is provided between the straight line 201 and the center of the circle 212. It is noted that when the operator by using the input device specifies two straight lines (for example the straight lines 201 and 202), and specifies the display position of the dimensional value (for example the dimensional B), a set of data identified by the code 300 i.e. the code 300 representing the dimensional value in the horizontal direction, the coordinate values, i.e. X1, Y1, X2, Y1, the end points of the straight lines 201 and 202 near to the display position of the dimensional value B, the coordinate data XB, YB representing the display position of the dimensional value B, and the dimensional value B are stored in the memory area 11. If the operator does not input the dimensional value B through the input device, a set of data relating to the dimensional value B are not stored in the memory area 11. Further, block 46 determines the condition (2) to determine whether the dimensional value E between the vertical lines 205 and 206 which are spaced from the vertical dashed line 213 by the same distance is stored in the memory area 11.

In the case of the straight line 201 being described, block 46 determines that the data of the dimensional value A is stored in the address K of the memory area 11. Then, the answer of block 46 is YES, and the operation proceeds to block 47. If the answer is NO, the operation returns to block 43.

Block 47 checks the data of the address K found by block 46 to determine the K coordinate value (X7 in this case) of the other straight line related to the straight line passing through the value XL1 of the X axis by the dimensional value (A), and sequentially reads the data in the addresses of the memory area 10 to determine whether the data includes the coordinate value in the K axis which is equal to the coordinate value (X7) and the color code which is equal to the first color code. If the answer is YES, the address in the memory area 10 is supplied to block 48. That is, if XL1=XL2 of the condition (1) is satisfied, block 47 selects the value XL3 as the X coordinate value through which the other straight line passes, and determines the address storing the coordinate value of the straight line passing through the value XL3 in the memory area 10. If XL1=XL3 of the condition (1) is satisfied in block 46, block 47 selects XL2 as the X coordinate value through which the other straight line passes, and determines the address in the memory area 10 storing the data of the straight line passing through the XL2. In the case of the straight line 201, as indicated by the data in the address K, the X coordinate value related to the straight line 201(XL1=X1) by the dimensional value A is the value X7. And, the data in the address N of the memory area 10 is checked to determine the address of the straight line passing through the value X7. Since the data in the address N does not include the coordinate value X7, the data of the next address N+1 is read out. Since the data in the address N+1 does not include the coordinate value X7, the data of the next address N+2 is read out. Since the data in the address N+2 does not include the coordinate value X7, the data in the next address N+3 is read out. Since the data in the address N+3 includes the coordinate value X7 and the color code is the second color code, i.e. the red color code, block 46 supplies the address N+3 to block 48.

Figure 6:
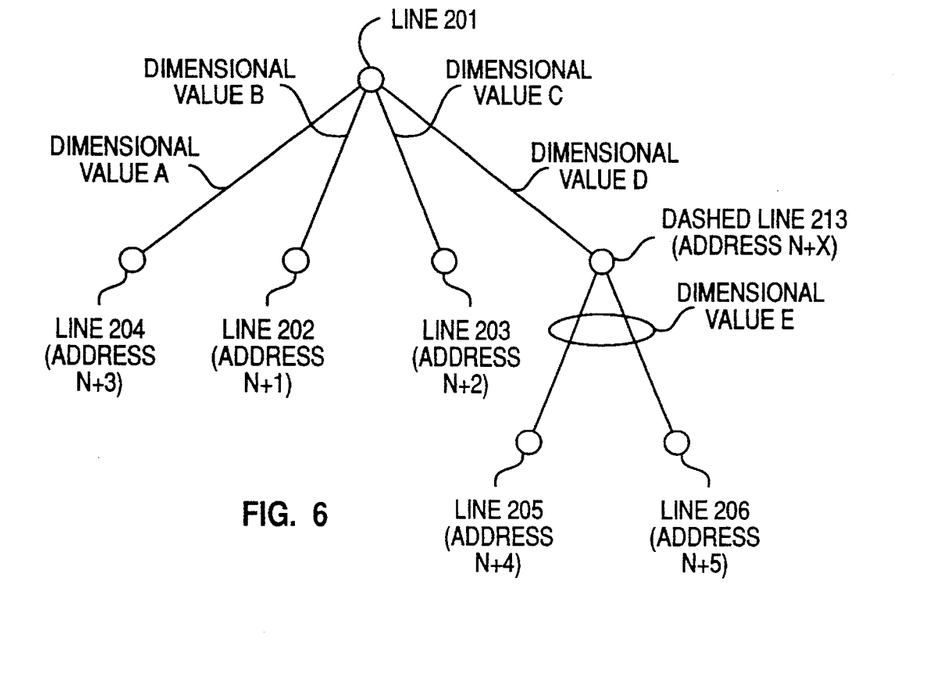
FIG. 6 illustrates the results of the verification operation according to the present invention.

The operation proceeds to block 48, in which under control of the control device 4, the address N+3 found by block 47 is stored in the register 6. Since all the stages of the register 6 do not include any data at this time, the address N+3 is stored in stage 61, as shown in FIG. 3. The operation then returns to block 47. In this manner, the straight line 204 related to the straight line 201 by the dimensional value A is found, and the address N+3 of the straight line 204 is stored in the register 6. FIG. 6 illustrates the results of the verification operation.

Block 47 determines whether the data in the address N+4 which is the next address after address N+3 includes the X value (X7) and the red color code. Since the answer is NO, block 47 determines whether the data in the remaining addresses starting from address N+5 includes the X value (X7) and the red color code. Since the answer is NO, the operation returns to block 46. This indicates that the straight line separated from the straight line 201 by the dimensional value A and including the red color code is only the straight line 204.

Next, block 46 determines whether a dimensional value which differs from the dimensional value A is provided from the straight line. Again, block 46 determines whether another dimensional data related to the straight line passing through the X value XL1 (X1 of the straight line 201 in this case) is stored in the memory area 11. Since the address K in the memory area 11 has been already checked in the previous operation, the operation is started from the address K+1. Since the X values X1 and X2 are stored in the address K+1, the operation proceeds to block 47, and block 47 sends the address N+1 including the data of the straight line 202 passing through the value X2 and the red color code to block 48. The address N+1 is stored in the stage 62 of the register 6, as shown in FIG. 3.

In this manner, the straight line 202 related to the straight line 201 by the dimensional value B is found, and its address N+1 is stored in the register 6. The results of the operation are shown in FIG. 6. Further, to determine whether another straight line related to the straight line 201 by the dimensional value B exists, the operation returns to block 47. Block 47 determines whether the dimensional data stored in the remaining address starting from the address K+2 in the memory area 11 includes the value X2. Since the answer is NO, the operation returns to block 46.

Next, block 46 determines whether a dimensional value which differs from the dimensional value B is provided from the straight line 201. Block 46 starts to check from the address K+2 to determine whether another dimensional data related to the X value XL1=X1 of the straight line 201 is stored in the memory area 11. Since the X values X1 and X6 are stored in the address K+2, the operation proceeds to block 47 which supply the address N+2 including the data of the straight line 203 passing through the value X6 and the red color code to block 48 so that the address N+2 is stored in the stage 63 of the register 6. The operation returns to block 47 to determine another straight line related by the dimensional value C. Since another straight line related by the dimensional value C does not exist, the operation returns to block 46.

In this manner, the straight line 203 related to the straight line 201 by the dimensional value C is found, and its address N+2 is stored in the stage 63 of the register 6. The results of the operation is shown in FIG. 6.

Next, block 46 determines whether another dimensional value differing from the dimensional value C is provided from the straight line 201. Block 46 starts to check from the address K+3 to determine whether the dimensional data related to the value XL1=X1 of the straight line 201 is stored in the memory area 11. Since the address K+3 stores the X values X1 and X4, the operation proceeds to block 47 and supplies the address N+X including the data of the dashed line 213 passing through the value X4 and the red color code to block 48, so that the address N+X is stored in the stage 64 of the register 6, as shown in FIG. 3. The operation returns to block 47 to determine another straight line related by the dimensional value D. Since another straight line related by the dimensional data D do not exist, the operation returns to block 46.

In this manner, the dashed line 213 related to the straight line 201 by the dimensional value D is found, and its address N+X is stored in the stage 64 of the register 6. The results of the operation are shown in FIG. 6. Block 46 checks the dimensional data in the addresses from the address K+4 in the memory area 11 to determine whether a dimensional value differing from the dimensional value D is provided from the straight line 201. Since the answer is NO, the operation returns to block 43. In block 43, since the address N+3 is stored in the stage 61 of the register 6, the operation proceeds to block 45, in which the address N+3 in the stage 61 of the register 6 is supplied to the color code supply device 5, and the red color code in the address N+3 is changed to the green color code, whereby the displayed color of the straight line 20; on the display screen is changed from the red to the green. The change of the displayed color from the red to the green indicates that the dimensional value A is provided between the straight line 201 and the straight line 204.

The operation proceeds to block 46 which determines whether the condition (1) or (2) is satisfied by using the X value (X7) in the address N+3 as the value XL1. Block 46 determines the dimension data stored in the address K of the memory area 11. The operation proceeds to block 47, which determines the address N of the straight line 201 related to the value X7 by the dimensional value A and checks the color code in the address N. Since the color code which is the first code or the green color code at this time is not the second color code, i.e. the red color code, the operation returns to block 46. In block 46, the addresses from the address K+1 are checked. Since the answer of block 46 is NO, the operation returns to block 43. This indicates that another dimensional value from the straight line 204 is not provided, as shown in FIG. 6.

Since the address N+1 is stored in the stage 61 of the register 6 at this time, the answer of block 43 is YES, and the operation proceeds to block 45. In block 45, the address N+1 is supplied from the stage 61 to the color code supply device 5, and the color code is changed from the red color to the green color, so that the displayed color of the straight line 202 is changed from the red color to the green color. As described hereinbefore, the change from the red color to the green color indicates that the dimensional value B is provided between the straight line 201 and the straight line 202.

The operation proceeds to block 46, which determines whether the condition (1) or (2) is satisfied by using the X value X2 in the address N+1 as the value XL1. Block 46 determines the dimension data in the address K+1 of the memory area 11. The operation proceeds to block 47, which determines the address N of the straight line 201 passing through the value X1 related to the value X2 by the dimensional value B and checks the color code in the address N. This color code, i.e. the first green code, is not the second or red code, the operation returns to block 46. In block 46, the addresses from the address K+2 in the memory area 11 are checked. The answer is NO, and the operation returns to block 43. This represents that another dimension is not provided from the straight line 202, as shown in FIG. 6. At this time, the address N+2 is stored in the stage 61 of the register 6, then the answer of block 43 is YES, and the operation proceeds to block 45. In block 45, the address N+2 is supplied from the stage 61 to the color code supply device 5 and the color code in the address N+2 is changed from the red color to the green color, so that the displayed color of the straight line 203 on the display screen is changed from the red color to the green color. As described hereinbefore, the change of the displayed color indicates that the dimensional value C is provided between the straight line 201 and the straight line 203.

The operation proceeds to block 46, which determines whether the condition (1) or (2) is satisfied by using the value X6 in the address N+2 as the value XL1. Block 46 determines the dimension data stored in the address K+2 of the memory area 11. The operation proceeds to block 47, which determines the address N of the straight line 201 related to the value X6 by the dimensional value C and checks the color code in the address N. Since the color code, i.e. first or green color code, is not the second or red color code, the operation returns to block 46. In block 46, the addresses from the address K+3 are checked. The answer of block 46 is NO, then the operation returns to block 43. This indicates that another dimensional value is not provided from the straight line 203, as shown in FIG. 6.

At this time, since the address N+X is stored in the stage 61 of the register 6, the answer of block 43 is YES, and the operation proceeds to block 45. In block 45, the address N+X is supplied from the stage 61 to the color code supply device 5, and the color code in the address N+X is changed from the red color to the green color, so that the displayed color of the dashed line 213 on the display screen is changed from the red color to the green color. As described hereinbefore, the change of the displayed color from the red color to the green color represents that the dimensional value D is provided between the straight line 201 and the dashed line 213.

Figure 7:
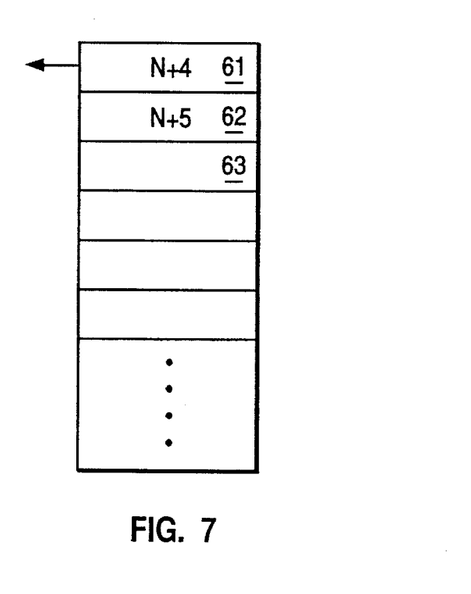
FIG. 7 illustrates the contents of register 6.

The operation proceeds to block 46, which determines whether the condition (1) or (2) is satisfied by using the value X4 in the address N+X as the value XL1. In this case, the condition (1) is not satisfied. That is, the data including the value X1 as the first value in not out in the memory area 11. However, the condition (2) is satisfied. That is, XL1=X4 and the values X3 and X5 satisfies the condition (2). That is, block 46 determines that the data of the dimensional value S between the vertical straight lines 205, (X3) and 206, (X5) separated frost the dashed line 213 by the same distance is stored in the address K+4 of the memory area Block 47 determines the address N+4 including the value X3 and the red color code, and in block 48, the address N+4 is stored in the stage 61 of the register 6, as shown in FIG. 7. The operation returns to block 47, which determines the address N+5 including the value X5 and the red color code, and in block 48, the address N+5 is stored in the stage 62 of the register 6, as shown in FIG. 7.

In this manner, the operation for storing the address N+4 of the straight line 205 and the address N+5 of the straight line 206 indicates that the dimensional value E is provided between the straight lines 205 and 206 which are related to the dashed line 213.

The operation returns to black 47. The answer of block 47 is NO, and the operation returns to block 46. In block 46, the data of the addresses subsequent to the address K+4 are determined, but the data satisfying the condition (1) or (2) is not found, and the operation returns to block 43.

At this stage, since the address N+4 is stored in the stage 61 of the register 6, as shown in FIG. 7, the answer of block 43 is YES, and the operation proceeds to block 45, in which the address N+4 is supplied from the stage 61 to the color code supply device 5, so that the color code in the address N+4 is changed from the red color code to the green color code, whereby the displayed color of the straight line 205 on the display screen is changed from the red color to the green color.

The operation proceeds to block 46, which accesses the memory area 11 and determines the address K+4 storing the value X3 in the address N+4, and the operation proceeds to block 47. In block 47, the address N+5 storing the data of the straight line 206 passing through the other X value, i.e. X5, in the address K+4 is found out, and this address N+5 is stored in the stage 62 of the register 6 in block 48. The operation returns to block 47. Since the answer of block 47 is NO, the operation returns to block 46. Since the answer of block stage, the address N+5 is stored in the stage 61 of the register 6. In blocks 43 and 45, the color code in the address N+5 is changed from the red color code to the green color code and the operation proceeds to block 46. In block 46, the address K+11 storing the value X5 of the address N+5 is found, and the address N+4 storing the data of the straight line passing through the value X3 is found. However, since the color code in the address N+4 has been already changed to the green color code, the answer of block 47 is NO, and the operation returns to block 46. Since the answer of block 46 is NO, the operation returns to block 43.

In blocks 43 and 45, although the address N+5 in the stage 61 of the register 6 is supplied to the color code supply device 5, the color code of the address N+5 is not changed, since the color code has been already changed to the green color code. In block 46, the address K+4 storing the value X5 of the address N+5 is found. However, since the color code in the address N+4 storing the straight line passing through another X value, i.e. X3, of the address K+4 has been changed to the green color code, the answer of block 47 is NO, and the operation returns to block 46. Since the answer of block 46 is NO, the operation returns to block 43. At this time, any address is not stored in the register 6 the operation proceeds to block 44 and the operation is terminated.

Figure 4:
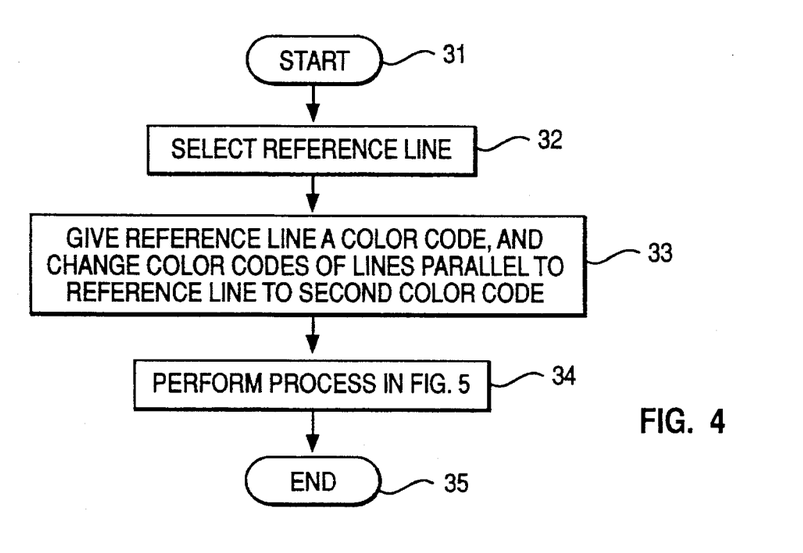
FIGS. 4–5 are a flowchart illustrating a verification operation according to the present invention.

As apparent from the above description, in block 33 of FIG. 4, the color codes of all the vertical straight lines are changed from the first or green color code to the second or red color code, so that the displayed color of all the vertical straight lines on the display screen is changed to the red color, while the color of the horizontal dimensional values are green color. By the method shown in FIG. 5, the color of the vertical straight line related one vertical straight line by the dimensional value is returned to the first or green color.

Figure 8:
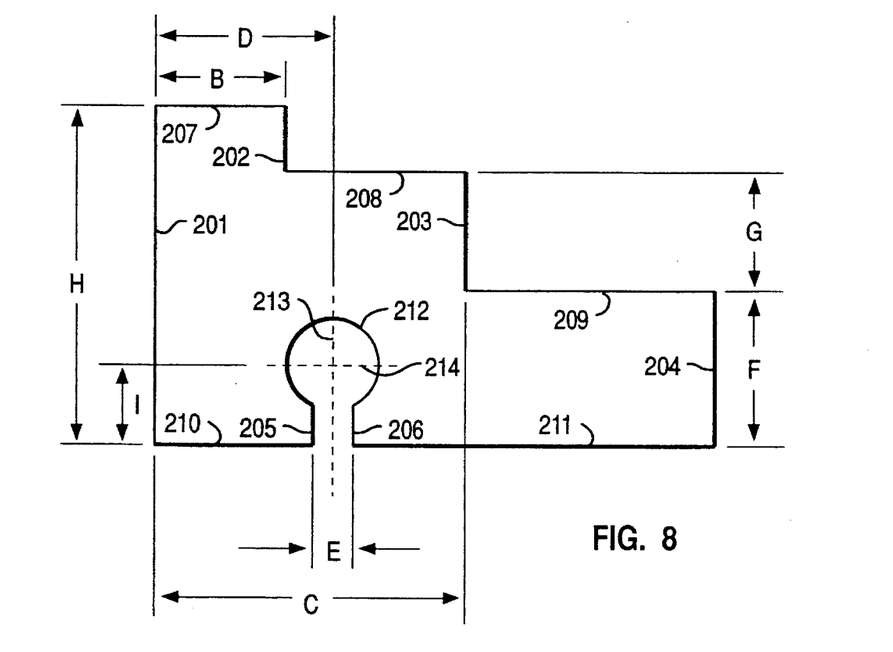
FIG. 8 illustrates another example of the drawing and dimensional values.

If the dimensional value A between the straight lines 201 and 204 is not drawn or provided by the operator, as shown in FIG. 8, the color of the straight line 204 is not changed to the green color and continuously displayed as the red color. The display of the red color notifies the operator that the dimensional value related to the red colored straight line is not drawn or provided.

This operation is described as below. Since the dimensional value A is not written or provided by the operator, the data of the dimension A (i.e. 300, X1, Y5, X7, Y5, XA, YA, A) are not stored in the memory area 11, while the data of the dimensional values B, C, D and E are stored in the memory area 11 since these data are provided by the operator. It is assumed that the data of the dimensional values B, C, D and E are stored in the addresses K+1, K+2, K+3 and K+4 in the memory area 11, as shown in FIG. 3.

Figure 9:
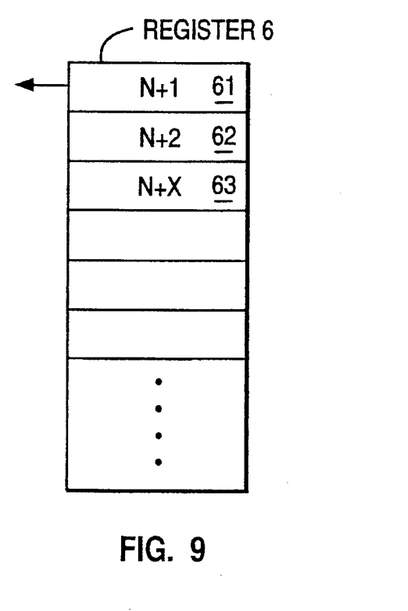
FIG. 9 illustrates the contents in register 6.

In block 33 of FIG. 4, the color codes of all the vertical straight lines 201. 202. 203, 2014, 205 and 206 are changed from the first or green color code to the second or red color code. It is assumed in this case that the straight line 201 is selected as the reference address N of the straight line 201 stored in the stage 61 of the register 6 is supplied to the color code supply device 5 to change the color code from the red color code to the green color code, whereby the displayed color of the straight line 201 on the display screen is returned to the green color. In blocks 46, 47 and 48, the addresses N+1, N+2 and N+X of the straight lines 202 and 203 and the dashed line 213 which are related to the straight line 201 by the dimensional values are stored in the register 6, as shown in FIG. 9. This indicates that the straight lines 202 and 203 and the dashed line 213 are related to the straight line 201 by the dimensional values B, C and D, respectively. The straight line 204 is not related to the straight line 201 since a dimensional value is not written or provided between the lines 201 and 204 by the operator. Whenever each of the addresses N+1. N+2 and N+X of the lines 202, 203 and 213 is read from the register 6, the displayed color of the lines is returned from the red color to the green color. When the address N+X is read from the register 6, the color code is returned from the red color to the green color in block 45. Block 46 determine that the condition (2) is satisfied, and the addresses N+4 and N+5 of the straight lines 205 and 206 are stored in the register 6, as shown in FIG. 7, and the operation already described with respect to FIG. 7 is performed, so that the displayed color of the straight lines 205 and 206 on the display screen are returned from the red color to the green color.

Figure 10:
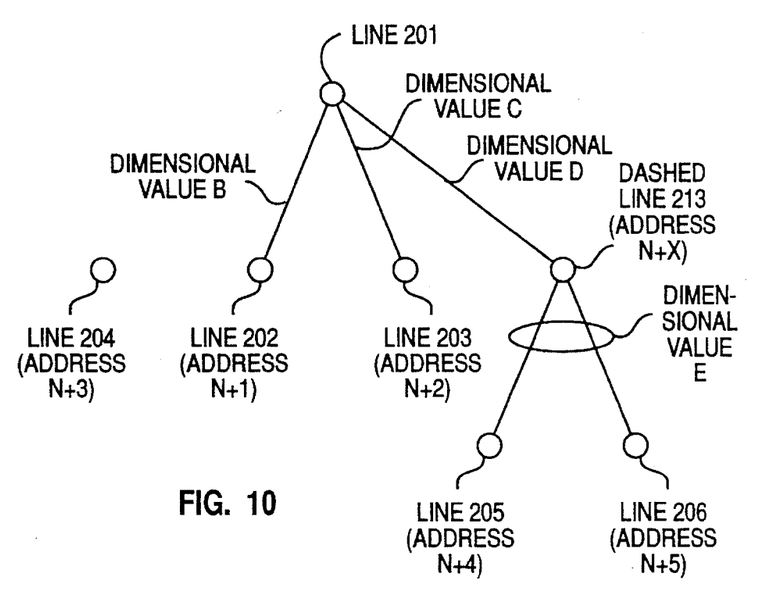
FIG. 10 illustrates the results of the verification operation according to the present invention.

In the above operation, since the address N+3 of the straight line 204 is not stored in the register 6, and can not be supplied to the color code supply device 5, the displayed color of the straight line 204 is the red color. That is, the displayed color of the line 204 is not changed from the red color to the green color. This notifies the operator that the dimensional value related to the straight line 204 is not written or provided by the operator. FIG. 10 illustrates the result of this verification operation.

The verification operation for determining whether the dimensional values F, G, H and I in the vertical direction shown in FIG. 2 are written or provided by the operator is the same as the verification operation for verifying the dimensional values in the horizontal direction, except that blocks 45, 46 and 47 use the values Y on the Y axis in place of the values X on the X axis.

In block 45, under the control of the control device 4, the address in the stage 61 of the register 6 is supplied to the color code supply device 5, and the color code of the horizontal straight line stored in this address is returned from the second or red color code to the first or green color code, and the value YL1 representing the position in the Y direction among the data in the address is supplied to the comparison device In block 46, the comparison device 3 determines whether the value YL1 supplied from block 45 and the two Y values (i.e. YL2 and YL3) in the dimensional data of the straight lines which are sequentially read from the memory area 11 satisfy the next condition (1A) or (2A).

$YL1=YL2$ or $YL1=YL3$   Condition (1A)

$YL1=(YL2+YL3)/2$   Condition (2A)

In other words, block 46 determines whether the dimension data satisfying the condition (1A) or (2A) are stored in the memory area 11, and if block 47 determines the data, block 47 supplies the address storing the data in the memory area 10 to block 48. In this operation, the data of the horizontal straight lines 207 through 211 stored in the addresses N+6 through N+10 and the data of the horizontal dashed line 214 stored in the address N+X+1 are used. It is assumed that the straight line 207 is selected as the reference straight line by the operator in block 32 of FIG. 4. In block 33, the color codes of the horizontal straight lines 207 through 211 in the addresses N+6 through N+10 and the color code of the dashed line 214 in the address N+X+1 are changed from the first or green color code to the second or red color code.

The operation proceeds to the method of FIG. 5, and, in block 41, the address N+6 of the straight line 207 is stored in the stage 61 of the register 6. Next, in block 45, the color code in the address N+6 is returned to the green color code. In blocks 46 through 48, the addresses N+9 and N+10 of the straight lines 210 and 211 related to the straight line 207 by the dimension value H are stored in the stages 61 and 62 of the register 6, and the operation returns to block 43. In blocks 43 and 45, the address N+9 of the straight line 210 in the stage 61 is supplied to the color code supply device 5, so that the displayed color of the straight line 210 is changed from the red color to the green color. Next, in blocks 46 through 48 the addresses N+X+1 and N+8 of the dashed line 214 and the straight line 209 related to the straight line 210 by the dimensional values I and F are stored in the stages 62 and 63 of the register 6, and the operation returns to block 43.

At this time, the address N+10 of the straight line 211 is stored in the stage 61 of the register 6, this 5, so that the displayed color of the straight line 211 is changed from the red color to the green color in block 45. In blocks 46 through 48, the address N+8 of the straight line 209 related to the straight line 211 by the dimensional value F is stored in the stage 63 of the register 6. At this time, since the address N+8 of the straight line 209 is stored in the stage 61 of the register 6, the displayed color of the straight line 209 is changed from the red color to the green color. In blocks 46 through 48, it is found that the straight line 208 is related to the straight line 209 by the dimensional value G, and the address N+9 of the straight line 208 is stored in the stage 63 of the register 6, and the operation returns to block 43.

In block 43, the address N+X+1 in the stage 61 of the register 6 is read out, and, in block 45, the color code of the address is changed from the red color to the green color. In blocks 46 through 47, it is detected that another line related to the dashed line 214 by a dimensional value does not exist and the operation returns to block 43.

Figure 11:
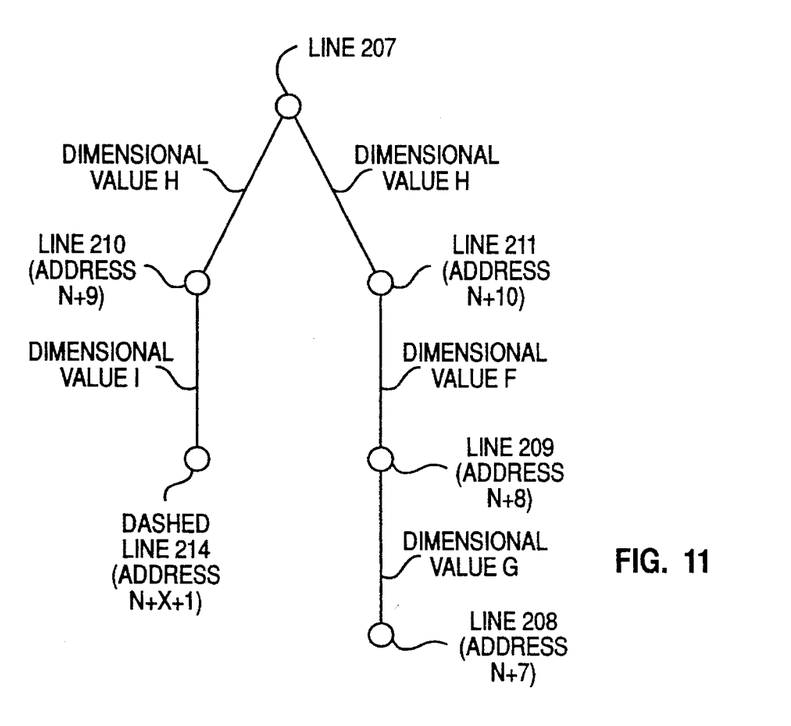
FIG. 11 illustrates the results of the verification operation according to the present invention.

In blocks 43 through 47, it is found that another straight line related to the straight line 208 by a dimensional value does not exist, and the operation returns to block 43. At this time, since an address is not stored In the register 6, the operation proceeds to block 44, and the operation is terminated. FIG. 11 shows the results of the above described verification operation. In the above example, all the dimensional values F through I are written or provided by the operator, and the verification operation detects that the horizontal straight lines 207, 208, 209, 210 and 211 and the dashed line 214 are related to each other by the dimensional values H, I, F and G and the displayed color of all the lines are changed from the red color to the green color. This indicates that all the dimensional values F, G, H and I are written or provided by the operator. In the case that one dimensional value, for example, the dimensional value I is not written or provided by the operator, the address N+X+1 of the dashed line 214 is not stored in the register 6 in blocks 46 through 48 of FIG. 5, so that the displayed color of the dashed line 214 is not changed from the red color to the green color. This notifies the operator that the dimensional value I is not written or provided by the operator.

As described above, the present invention can determine whether all the required dimensional values are written or provided by the operator.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of checking a drawing for any unprovided for dimensional value between two parallel lines, comprising the steps of:

displaying at least one portion of said drawing on a display screen;

selecting a first line, with information provided by a user, from said displayed portion of said drawing;

providing said first line with a first indicator and providing each line parallel to said first line, within said displayed portion of said drawing, with a second indicator;

determining whether a dimensional value is provided for between each pair of parallel lines within said displayed portion of said drawing; and changing said second indicator of each line to said first indicator in response to a determination that said dimensional value is provided for.

2. The method of claim 1 wherein said first indicator is a first color and said second indicator is a second color.

3. The method of claim 2 wherein a line, within said displayed portion of said drawing, without said first indicator or said second indicator is in a third color.

4. An apparatus for checking a drawing for any unprovided for dimensional value between two parallel lines, comprising:

means for displaying at least one portion of said drawing on a display screen;

means for selecting a first line, with information provided by a user, from said displayed portion of said drawing;

means for providing said first line with a first indicator and providing each line parallel to said first line, within said displayed portion of said drawing, with a second indicator;

means for determining whether a dimensional value is provided for between each pair of parallel lines within said displayed portion of said drawing; and means for changing said second indication of each line to said first indication in response to a determination that said dimensional value is provided for.

5. The apparatus of claim 4 wherein said first indicator is a first color and said second indicator is a second color.

6. The apparatus of claim 5 wherein a line, within said displayed portion of said drawing, without said first indicator or said second indicator is in a third color.

7. A method for verifying a dimensional value is provided for between each pair of parallel straight lines within a drawing comprising steps of:

storing in a memory means first data and second data, wherein said first data including a color code and a set of coordinate values for each straight line forming said drawing, and said second data including a dimensional value for a dimension between each pair of parallel straight lines within said drawing and two coordinate point values, each of said coordinate point values being from each of said pair parallel straight lines;

supplying said first data and said second data to a display means to display said drawing and said dimensional values on a display screen;

changing, in response to a selection of a straight line by an operator, said color code of said selected straight line to a predetermined first color code, and changing said color code of each straight line parallel to said selected straight line to a second color code;

reading said second data including said two coordinate point values, wherein one of said two coordinate point values is equal to a coordinate point value of said selected straight line; and changing said second color code of said straight line parallel to said selected straight line to said first color code if said dimensional value is present.

8. A method according to claim 7, wherein said coordinate values and said coordinate point values of said first data and second data respectively are values in X direction of XY coordinates.

9. A method according to claim 7, wherein said coordinate values and said coordinate point values of said first data and second data respectively are values in Y direction of XY coordinates.

10. An apparatus for verifying a dimensional value is provided for between each pair of parallel straight lines within a drawing comprising steps of:

memory means for storing first data and second data, wherein said first data including a color code and a set of coordinate values for each straight line forming said drawing, and said second data including a dimensional value for a dimension between each pair of parallel straight lines within said drawing and two coordinate point values, each of said coordinate point values being from each of said pair parallel straight lines;

means for supplying said first data and said second data to a display means to display said drawing and said dimensional values on a display screen;

means for changing, in response to a selection of a straight line by an operator to access addresses of said memory means at which said first data of straight lines parallel to said selected straight line are stored, said color code of said selected straight line to a predetermined first color code, and changing said color code of each straight line parallel to said selected straight line to a second color code;

means for sequentially reading said second data from said memory means to find said two coordinate point values wherein one of said two coordinate point values is equal to a coordinate point value of said selected straight line; and means for changing said second color code of said straight line parallel to said selected straight line to said first color code if said dimensional value is present.

11. An apparatus according to claim 10, wherein said coordinate values and said coordinate point values of said first data and second data respectively are values in X direction of XY coordinates.

12. An apparatus according to claim 10, wherein said coordinate values and said coordinate point values of said first data and second data respectively are values in Y direction of XY coordinates.

* * * * *